US009009090B2

(12) United States Patent
Poulin

(10) Patent No.: US 9,009,090 B2
(45) Date of Patent: Apr. 14, 2015

(54) PREDICTIVE MODEL DATABASE WITH PREDICTIVE MODEL USER ACCESS CONTROL RIGHTS AND PERMISSION LEVELS

(76) Inventor: Christian D. Poulin, Boston, MA (US)

( * ) Notice: Subject to any disclaimer, the term of this patent is extended or adjusted under 35 U.S.C. 154(b) by 162 days.

(21) Appl. No.: 13/446,082

(22) Filed: Apr. 13, 2012

(65) Prior Publication Data

US 2012/0310785 A1 Dec. 6, 2012

Related U.S. Application Data

(63) Continuation of application No. 11/952,205, filed on Dec. 7, 2007, now Pat. No. 8,160,977.

(60) Provisional application No. 60/874,192, filed on Dec. 11, 2006.

(51) Int. Cl.
*G06F 15/18* (2006.01)
*G06F 17/30* (2006.01)
*G06Q 10/04* (2012.01)

(52) U.S. Cl.
CPC ..................................... *G06Q 10/04* (2013.01)

(58) Field of Classification Search
USPC ........................................................ 706/21
See application file for complete search history.

(56) References Cited

U.S. PATENT DOCUMENTS

2006/0106743 A1* 5/2006 Horvitz ........................... 706/21

OTHER PUBLICATIONS

Chong et al., Traffic Accident Analysis Using Machine Learning Paradigms. Infomatica, vol. 29 No. 1 [online], May 2005 [retrieved on Dec. 15, 2013]. Retrieved from the Internet:<URL:http://www.informatica.si/PDF/Informatica_2005_1.pdf>.*
Deshpande et al., MauveDB: Supporting Modelbased User Views in Database Systems [online], SIGMOD 2006, Jun. 27-29, 2006 [retrieved on Jul. 31, 2014].Retrieved from the Internet:<URL:http://www.google.com/url?sa=t&rct=j&q=&esrc=s&frm=1&source=web&cd=1&ved=0CB8QFjAA&url=http%3A%2F%2Fdb.csail.mit.edu%2Fpubs%2Fsigmod06-mauvedb.pdf&ei=P0jcU9>.*

* cited by examiner

*Primary Examiner* — Jeffrey A Gaffin
*Assistant Examiner* — Nathan Brown, Jr.
(74) *Attorney, Agent, or Firm* — Fish & Richardson P.C.

(57) ABSTRACT

Techniques to estimate the probability of a future event occurring are described. The techniques include decomposing a data input stream to build a database of precursor data and building predictive models using the precursor data. Also disclosed are techniques in which by using a search engine to search a database of models to find a model and a user can query a found model to develop an inference of the likelihood of the future event.

27 Claims, 16 Drawing Sheets

PREDICTIVE MODEL DATABASE WITH PREDICTIVE MODEL USER ACCESS CONTROL RIGHTS AND PERMISSION LEVELS

This application is a continuation (and claims the benefit of priority under 35 USC 120) of U.S. application Ser. No. 11/952,205, filed on Dec. 7, 2007 (now U.S. Pat. No. 8,160, 977), which claims the benefit of prior U.S. Provisional Application Ser. No. 60/874,192, filed on Dec. 11, 2006. The disclosure of the prior application is considered part of (and is incorporated by reference in) the disclosure of this application.

This application claims priority under 35 U.S.C. §119 to U.S. Provisional Patent Application Ser. No. 60/874,192, filed Dec. 11, 2006, and entitled "Collaborative Predictive Model Building" the entire contents of which are hereby incorporated by reference.

BACKGROUND

This invention relates to data analysis software.

Data is available in many forms, for many topics, and from many sources. The Internet is one example of a data source. The Internet has become an important tool to conduct commerce and gather information. Users, through a web browser, visit internet sites, e.g., web sites by accessing web sites and download web pages, e.g., documents in HTML (hypertext markup language) or equivalent.

SUMMARY

According to an aspect of the invention, a method executed in a computer system for estimating a probability that a future event will occur based on user input includes decomposing a data input stream to build a database of precursor data to build at least one predictive model, building a database of at least one model generated by a model building process using the precursor data in the database, with the at least one model being a model that produces predictions of the likelihood of an event occurring in the future based on analysis of data in the database and storing the at least one model in a second database that stores models, with the database being searchable, to permit the models in the database to be accessed by users.

The following embodiments are within the scope of the invention.

The method includes testing the model to optimize the model to refine accuracy level of the model. The method includes publishing the model. Building the database includes retrieving data as data strings from a data source and producing a dataset from the retrieved data strings. Building the model includes building a statistical model of parent-child relationships from data strings in the dataset by determining incidence values for the data strings in the dataset, and concatenating the incident values with the data strings to provide child variables, analyzing the child variables and the parent variables to produce statistical relationships between the child variables and a parent variable, determining probabilities values based on the determined parent child relationships. Modeling is based on a pattern recognition technique that can be a Bayesian algorithm, Markov rule-based, neural network or genetic algorithm.

The method includes calculating the accuracy of the model using a k-fold cross-validation. Analyzing the child variables and the parent variables to produce statistical relationships uses a Bayesian probability algorithm engine. The method includes calculating the accuracy against historical data. The method includes selecting access permissions for publishing the model. The method includes searching the database for model type. The method includes performing an inference operation the model to provide the probability of an event occurring. The method includes filtering noise from the data retrieved from the data source to provide the data strings.

According to an additional aspect of the invention, a method executed in a computer system includes using a search engine to search a database of models to find a model and querying the model to develop an inference of the likelihood of a future event.

The following embodiments are within the scope of the invention.

The method includes providing a market for use of the models. In the query a user specifies a parameter of data collection, with at least one of the parameters being a time interval. Once a model has been published other users can query the model for the probability that a future event will occur. An output is an inference or other analysis such as value of information analysis and so forth, that is related to the probability of a model predicting that the future event will occur. The method includes allowing a user to discard variables in the model below a certain threshold of relevancy for at least one of calculation time and predictive accuracy. Building of predictive models relates to health risk factors predictions, genetic traits predictions, commodity price predictions, movie success/revenue predictions, music popularity predictions, political behavior predictions, media bias predictions or games.

According to an additional aspect of the invention, a computer program product tangibly embodied in a computer readable medium for estimating a probability that a future event will occur based on user input, the computer program product comprises instructions for causing a computer to decompose a data input stream to build a database of precursor data to build at least one predictive model, build a database of at least one model generated by a model building process using the precursor data in the database, with the at least one model being a model that produces predictions of the likelihood of an event occurring in the future based on analysis of data in the database and store the at least one model in a second database that stores models, with the database being searchable, to permit the models in the database to be accessed by users.

According to an additional aspect of the invention, a computer program product tangibly embodied in a computer readable medium for estimating a probability that a future event will occur based on user input, the computer program product comprises instructions for causing a computer to use a search engine to search a database of models to find a model and query the model to develop an inference of the likelihood of a future event.

One or more aspects of the invention may provide one or more of the following advantages.

Users can build predictive models for or a user can search existing predictive models of a virtual marketplace for such models. The marketplace can advertise models available for commercial access to users and a relative price of those models. Various areas can use such models. For instance, in the area of "HEALTH" predictive models "health risk factors prediction," a "genetic traits prediction system" can be provided. Other areas include "WEALTH" predictive models such as a "securities value prediction system." Other areas include WISDOM" (e.g., knowledge) predictive models and the arrangements The details of one or more embodiments of the invention are set forth in the accompanying drawings and the description below. Other features, objects, and advantages of the invention will be apparent from the description and drawings, and from the claims.

DETAILED DESCRIPTION

Figure 1:
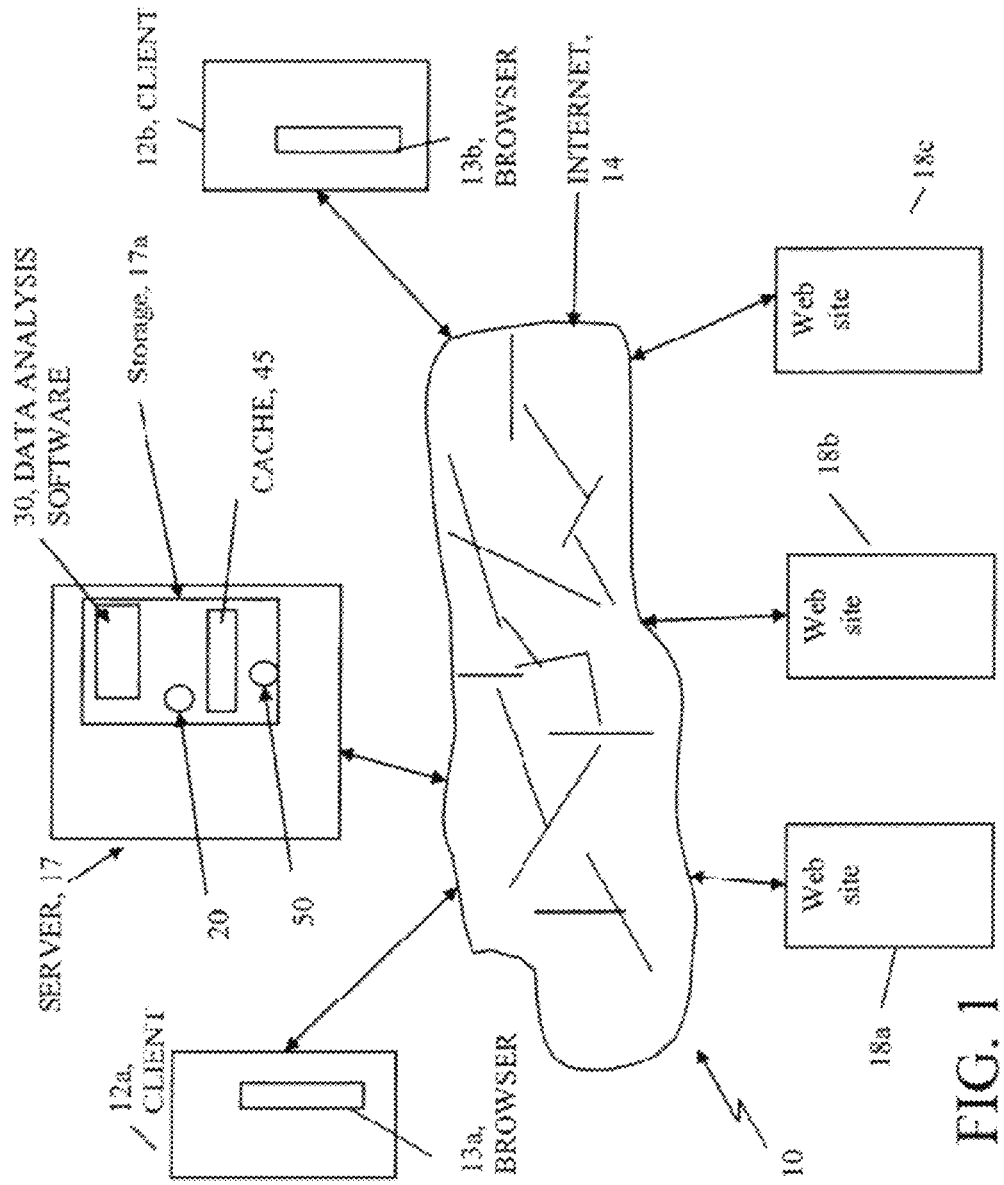
FIG. 1 is a block diagram of system employing data analysis software.

Referring to FIG. 1, a networked computer system 10 includes clients 12a-12b connected to a server system 17 through a first network, e.g., the Internet 14. The clients 12a-12b run browser programs 13a-13b that can request the server computer 17 to invoke data analysis software 30. The data analysis software 30 resides on a computer readable medium 17a, e.g., disk or in memory for execution. The data analysis software 30 can analyze data from any data source. As one example, the data analysis software 30 analysis data obtained from, e.g., the Internet by accessing site(s), e.g., web sites 18a-18d that are on web servers (not shown) through a universal resource locator (URL). A URL allows access to information that may be on sites 18a-18d, e.g., web sites (HTTP), FTP sites, NEWS groups, etc.

The data analysis software 30 can analyze data accessible through various protocols including HTTP, FTP mentioned above and other protocols such as proprietary protocols, e.g., for a database by modifying the URL location to contain a key word or other indicia for the proprietary protocol. Other networks and data sources could be used. For instance, the data analysis software 30 can operate on data from a proprietary data feed, a private network and so forth.

Although the data analysis software 30 is shown in FIG. 1 residing on a server 17 that can be operated by an intermediary service, it could be implemented as a server process on a client system 12 or as a server process on a corporate or organization-based server. On the server 17 the data analysis software 30 includes analysis objects 20 that are persistent objects, i.e., stored on a computer hard drive 17a of the server in a database (not shown). At invocation of the data analysis software 30, the analysis objects 20 are instantiated, i.e., initialized with parameters and placed into main memory (not shown) of the server 17, where they are executed through the data analysis software 30.

As described below, the output from the data analysis software 30 is a result object 50 in the form of a prediction table that can be output as an HTML or equivalent web page. The result object 50 will include information as to a database or text representation of relationships between parent and child data. Formats for the data can be ".net" files (industry standard file format for a Bayesian network file). Alternatively, other formats can be used such as a standard text file and so forth.

Figure 2:
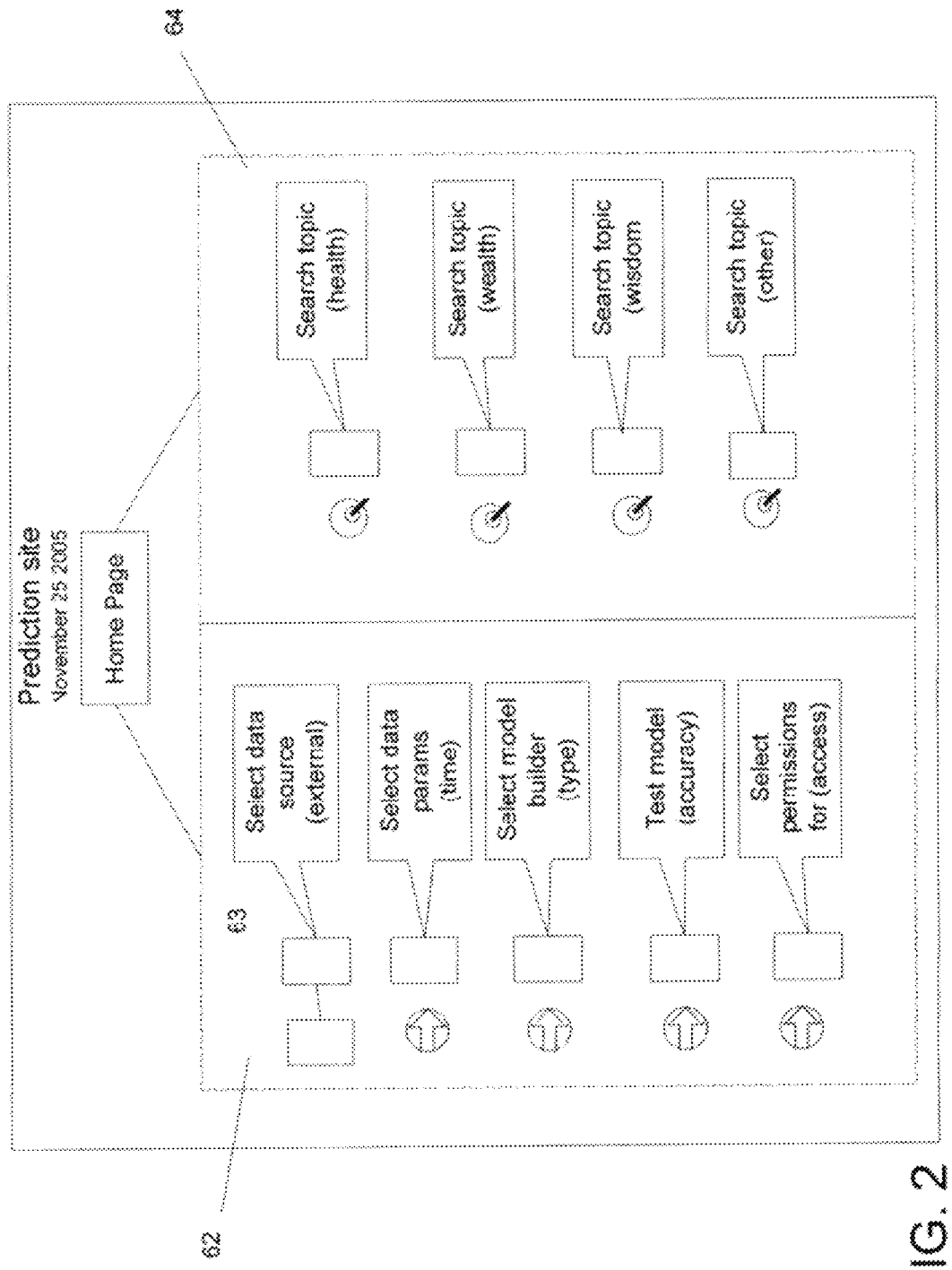
FIG. 2 is a block diagram depicting an overview of the modeling/searching.

Referring now to FIG. 2, the two behaviors (prediction and search) of a system 60, which either allows users to build models of the type as in FIG. 1 or has models of the type available for execution, e.g., available for search, are illustrated. The system 60 provides a technique 62 to build collaborative predictive models that are operated on by applications, e.g., by end users. These applications generate predictions of future behavior in various subject domains. Also provided is a mechanism to search 64 predictions of future behavior based on prior executions of the models.

The model building process 62 is described in detail below. The model building process 62 is used in conjunction with a database 63 that stores models 65 generated by the model building process. The database 63 has searchable content comprised of predictions of future behavior. The model building process allows for a user to "select data", "select data parameters", "select a model builder", "select access permissions", and "test the models."

In contrast, the features of search 64 also shown in FIG. 2 include searches 67 based on topics such as "health", "wealth", "wisdom", and "other."

Figure 2A:
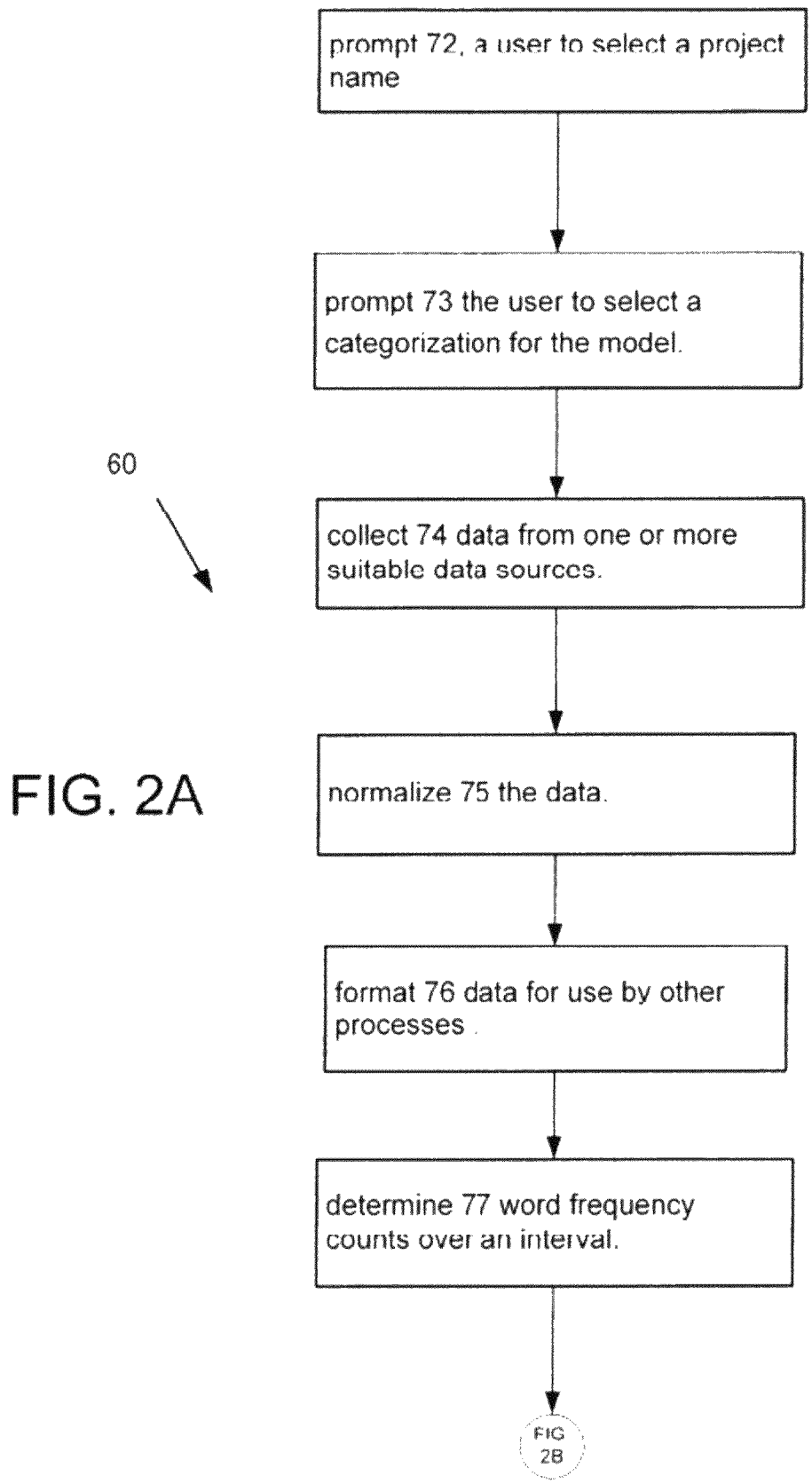
FIGS. 2A and 2B is a flow chart depicting model building with unstructured data and searching of the models.
Figure 2B:
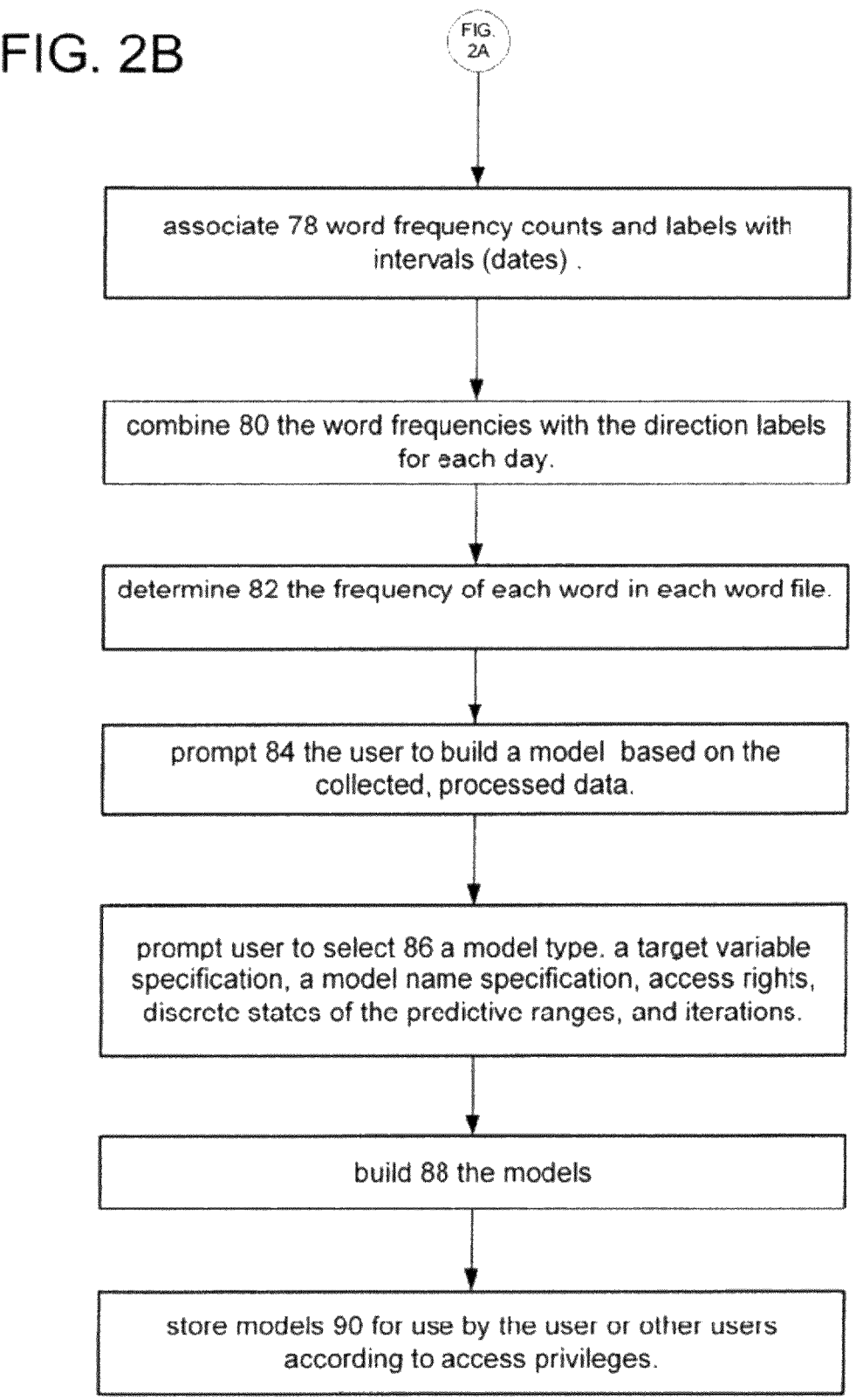

Referring now to FIGS. 2A and 2B, an exemplary technique 60 for implementing the model building process 62 is shown. The model building process 62 is further described in conjunction with the graphical user interfaces mentioned below. The process prompts 72 a user to select a project name that is concatenated with the username and carried throughout the process as a default identifier for the particular project. The process prompts 73 the user to select a categorization for the model to allow easier classification and categorization within the system. The model building process collects 74 data from one or more suitable data sources. An agent discussed below is provided parameters that control the data source collection, such as the location of the sources, and the period over which the source is collected. The collected data are collected as, e.g., separate data files for interval of collection, e.g., an hour, day, week, month and so forth as determined by the user based on factors such as expect volatility in changes in data in the data sources. Volatility can be determined empirically or by other techniques. Alternatively, the collection intervals can be fixed, e.g., a day of collection.

The process normalizes 75 the data by applying noise filtration and aggregation to the data to merge the multiple data collections into one file. The data normalization of the files extracts information corresponding to relevant information while removing noise (in this case HTML tags). Assuming a user selected interval of 24 hours, this procedure is batched processed and the contents of the various files are merged after 24 hours of collection providing a combined data file for each user selected interval. The process formats 76 the data for use by other processes in the system. The process determines 77 word frequency, e.g., count of the elements, e.g., words over an interval value is determined. A classification file associates 78 the word frequencies and labels with intervals (dates) based on the files from the data normalization. The data combining combines 80 the word frequencies with the direction labels for each day. The process determines 82 the frequency of each word in each word file.

With the data provided in the database, the system prompts 84 the user to build a model based on the collected, processed data. The system prompts to user to select 86 a model type, a target variable specification, a model name specification, access rights, discrete states of the predictive ranges, and iterations. The model building process builds 88 the model types and thereafter stored 90 for use by the user or other users according to access privileges, as discussed below.

Figure 2C:
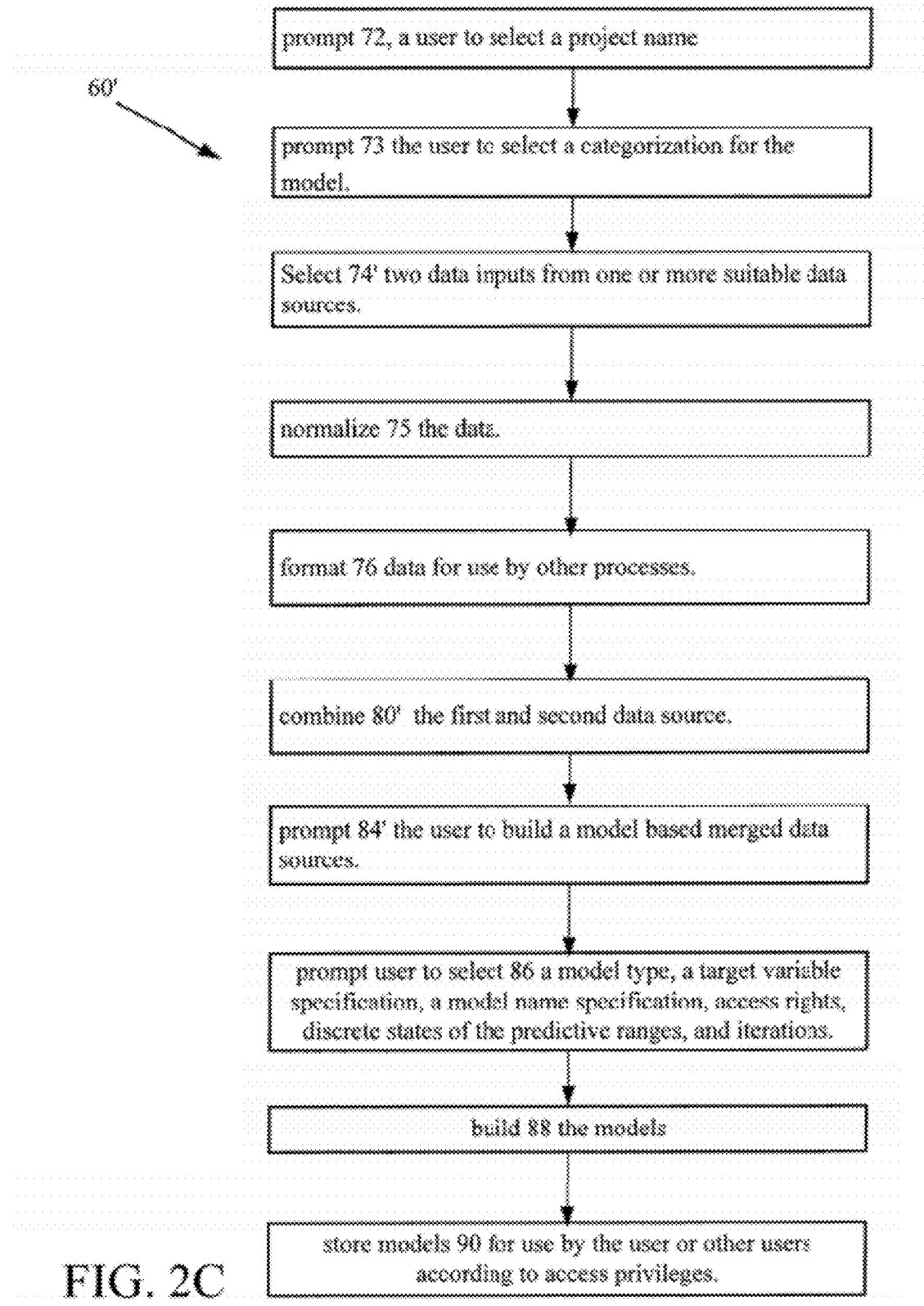
FIG. 2C depicts depicting model building with structured data and searching of the models.

Referring now to FIG. 2C, the model building/search process 60' for structured data is shown. In this process a user could select 2 data inputs that are numeric (such as S&P index vs. weather values). In this example, the process would use actions similar to that of FIGS. 2A and 2B for actions 72-76, but eliminates the unstructured data processing of 77 and 78 and goes to action 80', which here is merge of both numeric sources that combines the first and second data source, and eliminates the action at 82, and goes to 84 and thereafter continues processing, as in FIG. 2B.

Model Building Process

Figure 8:
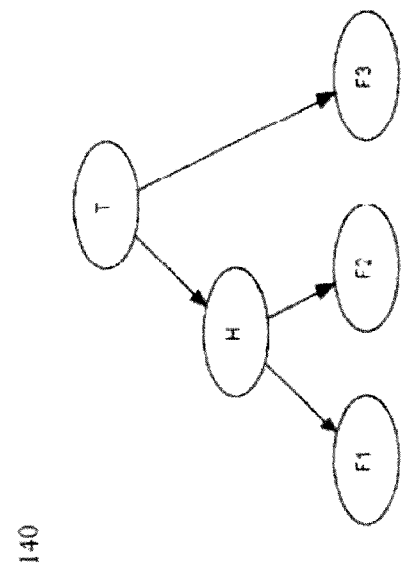
FIG. 8 is a diagram depicting a structure of a Hierarchical Naive Bayes Model (HNBM).
Figure 6:
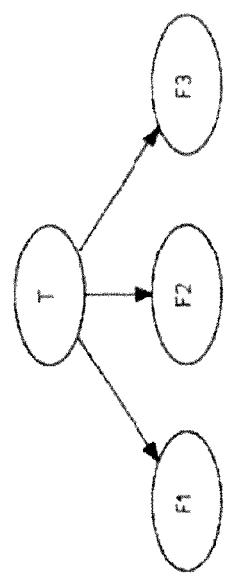
FIG. 6 is a diagram depicting a structure of a Naive Bayes Model (NBM.
Figure 7:
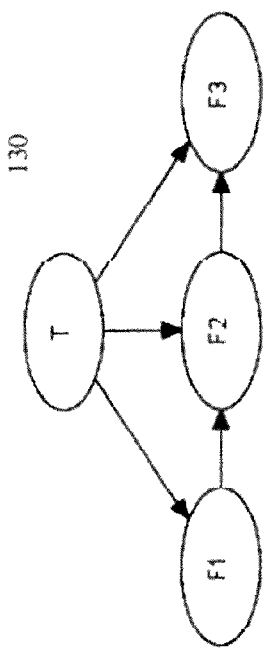
FIG. 7 is a diagram depicting a structure of a Tree-Augmented Naive Bayes Model (TAN).

Interface icons are used to abstract the mathematics of predictive modeling building. These 'Icons' are assumed as graphical representation of a process selectable by a user through a user interface. For instance data will have styled icons denoting their source, and model building functions will have such things as 'build', 'merge', and 'analyze' buttons. Specific model icons could be as shown in FIGS. 6, 7, and 8, as will be discussed below.

Figure 3:
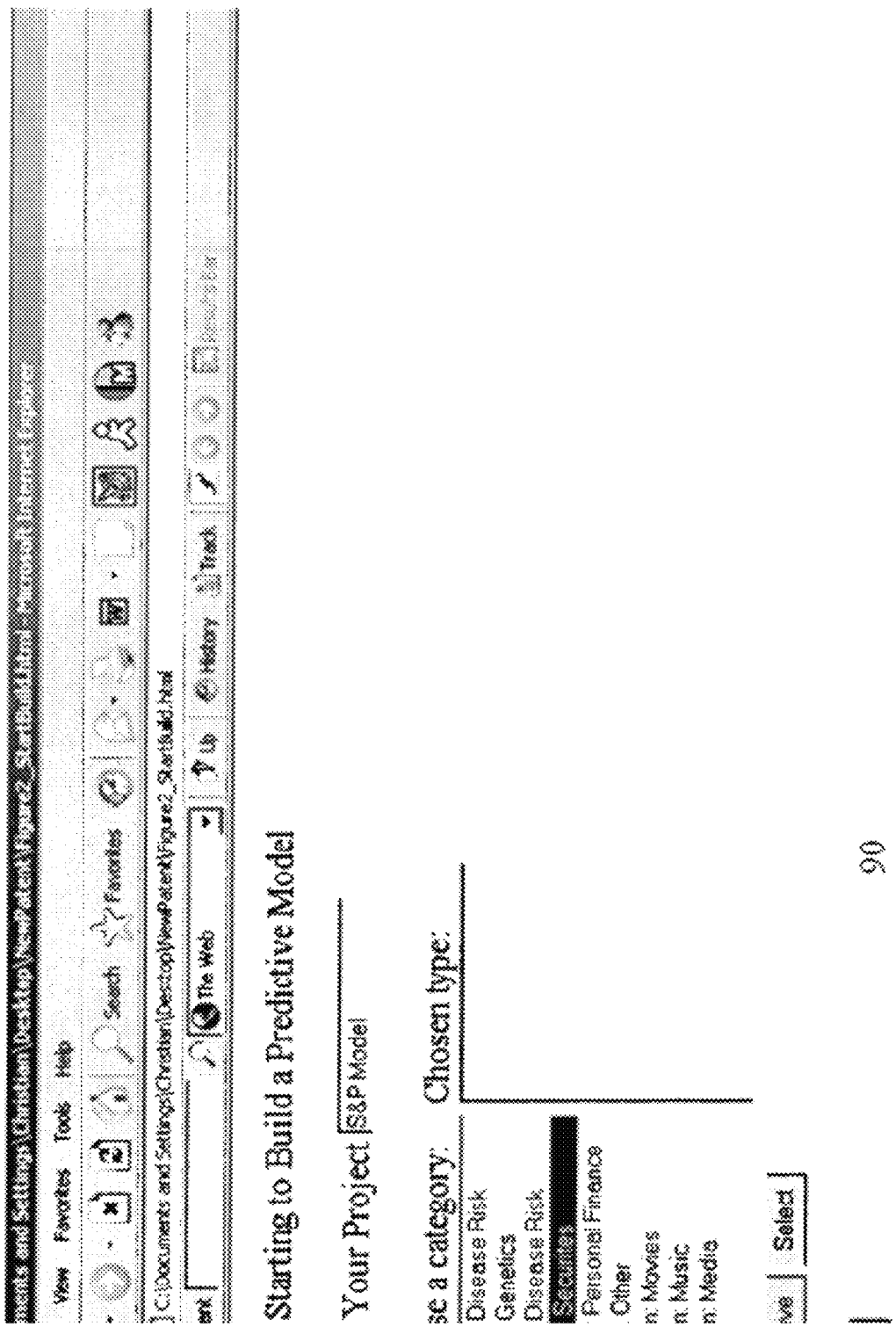
FIG. 3 is a diagram depicting a user interface for building a predictive model

Referring to FIG. 3, a user is prompted, via interface 90 to select a project name, that is concatenated with the username and carried throughout the system as a default identifier for the project. The process prompts the user to select a categorization for the model to allow easier classification and categorization within the system. As an example, the 'S&P model' is chosen as the project name and an example of 'Wealth: Securities' is selected as the classification.

Figure 3A:
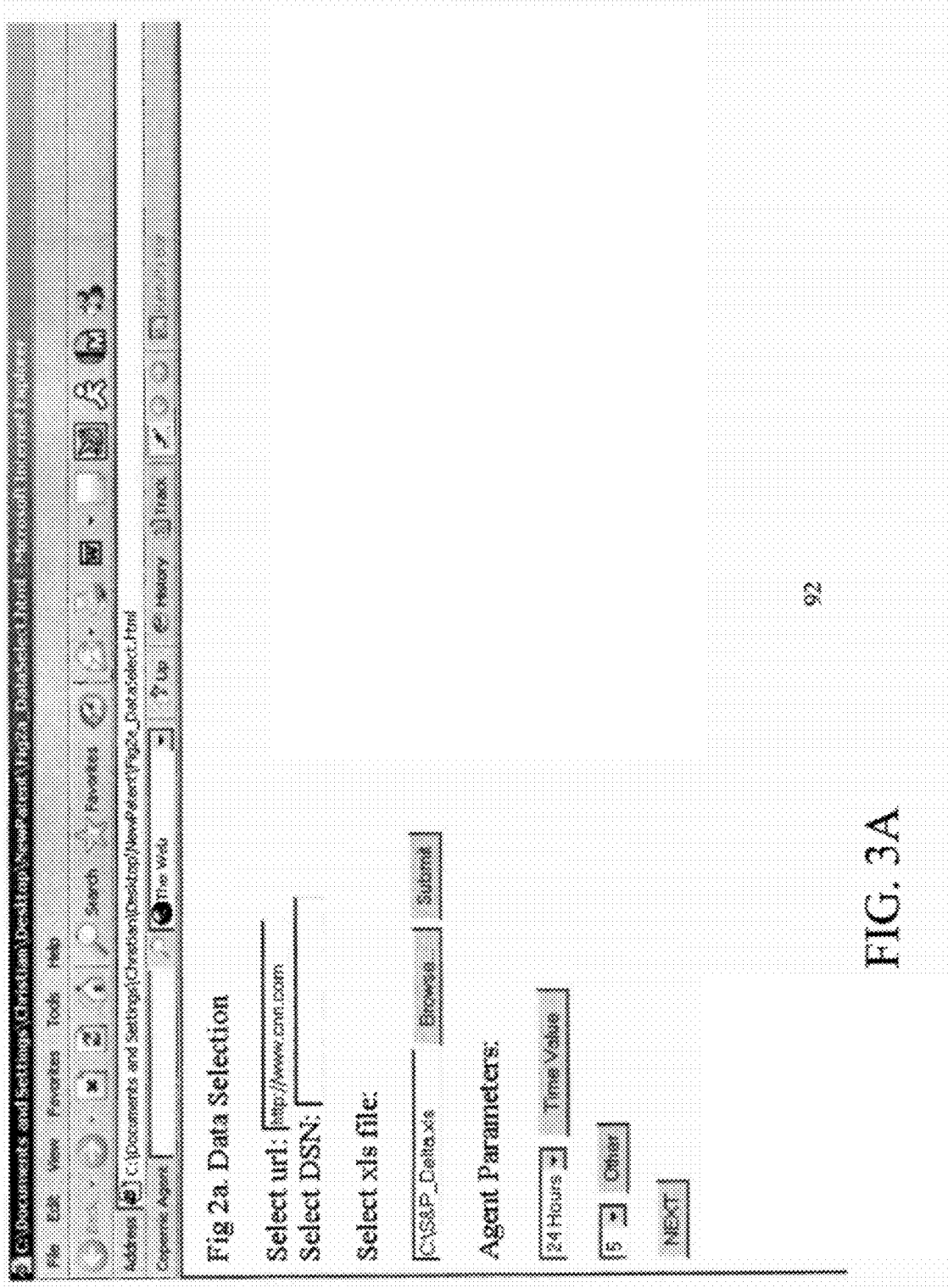
FIGS. 3A-3C are a series of user interface for data collection in building a predictive model, predictive model building and predictive model refinement.

The model building process includes a data collection process. As shown in FIG. 3A a graphical user interface 92 can be provided to aid the user in selecting data to collect. Presently, a suitable data source are one or more web data source or other remotely available data sources. Using a graphical process the user selects an agent icon, that can spawn a process (executable code) to collect data from the resource selected. 'Agents' are assumed as automated processes that fulfill tasks based upon inputs from the user interface.

The agent have parameters that control the data source collection. Examples of such parameters include 'url', 'dbase' and 'time'. 'url' would denote a Uniform Resource Locator link, 'dbase' would equal a database connector, such as a SQL database and 'time' would denotes how often the agent process collects the data from the url or dbase. A users selects parameters of the data that they are collecting to build the new database. While the user could choose a well defined structured data source, such as a classic database, for this example in FIG. 3A, the collection of data is derived from a URL.

As shown in FIG. 3A, the user is prompted to select the data to collect. The exemplary choices are 'url', 'dbase', and 'text only upload'. Meanwhile, the collection agent's parameters also set. Specifically, the 'time' setting having intervals from 24 hours to 30 sec. is selected. In this example URL of http://www.cnn.com is selected. In addition, an interval of 24 hours is selected. If an agent parameter of 'Time' has been selected as '8:30 am every 24 hours' then the process of collecting data is at this level of frequency. However, a parameter such as 'every hour' could be selected. With the user clicking 'Next' or other method to move forward in the process, the agent starts collecting the data according to the interval defined by the user.

The agent collects data from the website content as separate data files for each day of collection. For instance, the file "cnn.07-07-2007.html" specifies HTML source code of the main page of http://www.cnn.com on 7 Jul. 2007. The format of the news file adheres to the HTML standard. The raw news data files are placed into a single directory structure or other logical grouping.

As a URL's data is often unstructured, data normalization is used to apply noise filtration and aggregation to the data. In the example URL specified data financial news is chosen. Each news data file is an ASCII file having HTML tags and content. The data normalization of these files extracts information corresponding to relevant information while removing noise (in this case HTML tags). For instance, the words associated with a single news page are extracted as ASCII text file. A process is invoked that produces a file named (for instance) 'content.txt' containing relevant variables of a multi-set of the data objects in the html file.

Assuming a user selected interval of 24 hours, this procedure is batched processed and the contents of the various files are merged.

For instance for multiple URLs the result would look like '11-11-2006/cnn.11-11-2006.html 11-11-2006/money. cnn.11-11-2006.html we can combine in the file '11-11-2006/content.txt'.

The output of this process is one combined data file for each user selected interval, in this case 24 hours. The words for a given date will be a file named content.txt. The content file for a given date is, for example placed in a directory named after the date. For instance, the content.txt file for 15 Apr. 2004 is placed in the directory named 04-15-2004.

Once data from the URL has been collected, the data is formatted for use by other processes in the system. The word frequency, e.g., count of the elements, e.g., words over an interval value is determined. A classification file associates the word frequencies and labels with intervals (dates) based on the files from the data normalization. Further components of the system will require data normalization into a standard data format such as CSV (Comma Separated Value) file.

In the example of predicting the effect of news on S&P Futures, two data types are merged; web collected data (news) and S&P Futures prices (a separate file, e.g., a spreadsheet or the like. The S&P data file includes of a sequence of lines where each line specifies a date and the delta value of the S&P Futures price on that date. The Delta value is the change value denoting up or down movement. The delta value is computed by subtracting the value of the S&P price on the previous day from S&P on the day in question, e.g. the delta value for 15 Apr. 2006 is 1397.46−1377.95=19.51. Dates where the difference is equal to or above zero are associated with the label "up" while dates where the difference is less than zero are associated with the label "down". The label indicates whether the indicator went up or down when compared to the closing level the previous day.

Much like the URL collected data, the S&P data is formatted into the system format, which is in this example, (CSV). Based upon user input, the system merges the two columns corresponding to the date and direction labels for S&P into a separate CSV file "04-15-2004 up" Each line specifies a time interval and direction of change associated with the interval.

The data of the set of HTML news source files is combined with the spread sheet file) containing S&P Futures values. In this example the result of the S&P data formatting and the html news data is a file in the format (where the "word-Freqs.txt" files are word frequency files that are constructed as part of data normalization discussed below.). For instance, the file " . . . / . . . /NewsDataAll/04-15-2004/wordFreqs.txt up" In the file, each line of the file specifies the delta S&P Futures value for a particular file (i.e. date).

The data combining combines the word frequencies with the direction labels for each day. The process determines the frequency of each word in each word file. The word frequencies are extracted as an ASCII text file from the "content.txt" files and combined with the S&P Futures delta (difference) direction label. A command of this type produces one file of word frequencies and the S&P direction label for a given day. The format of the resulting file would have words associated with word counts and the delta value of the S&P 500. An exemplary format is: "in, to, Video, the, of, US, Iraq, CNNcom, S&P_Delta 12, 10, 7, 6, 6, 5, 5, 5, . . . , down" In this example, for the date "21 April 2004" the word "in" appears 12 times on the CNN URL, the word "to" appears 10 times, the word Vide appears 7 times and so forth, and the "S&P_Delta value" went down. The first line corresponds to a list of attributes specifying the number of occurrences of each word with the last attribute specifying the direction of change in the S&P value. Once the frequency/delta files are known for each of the interval values (in this case days), the frequency/delta files are merged into a single data file "wordFreqs.dat." for use by the model building process.

Figure 3B:
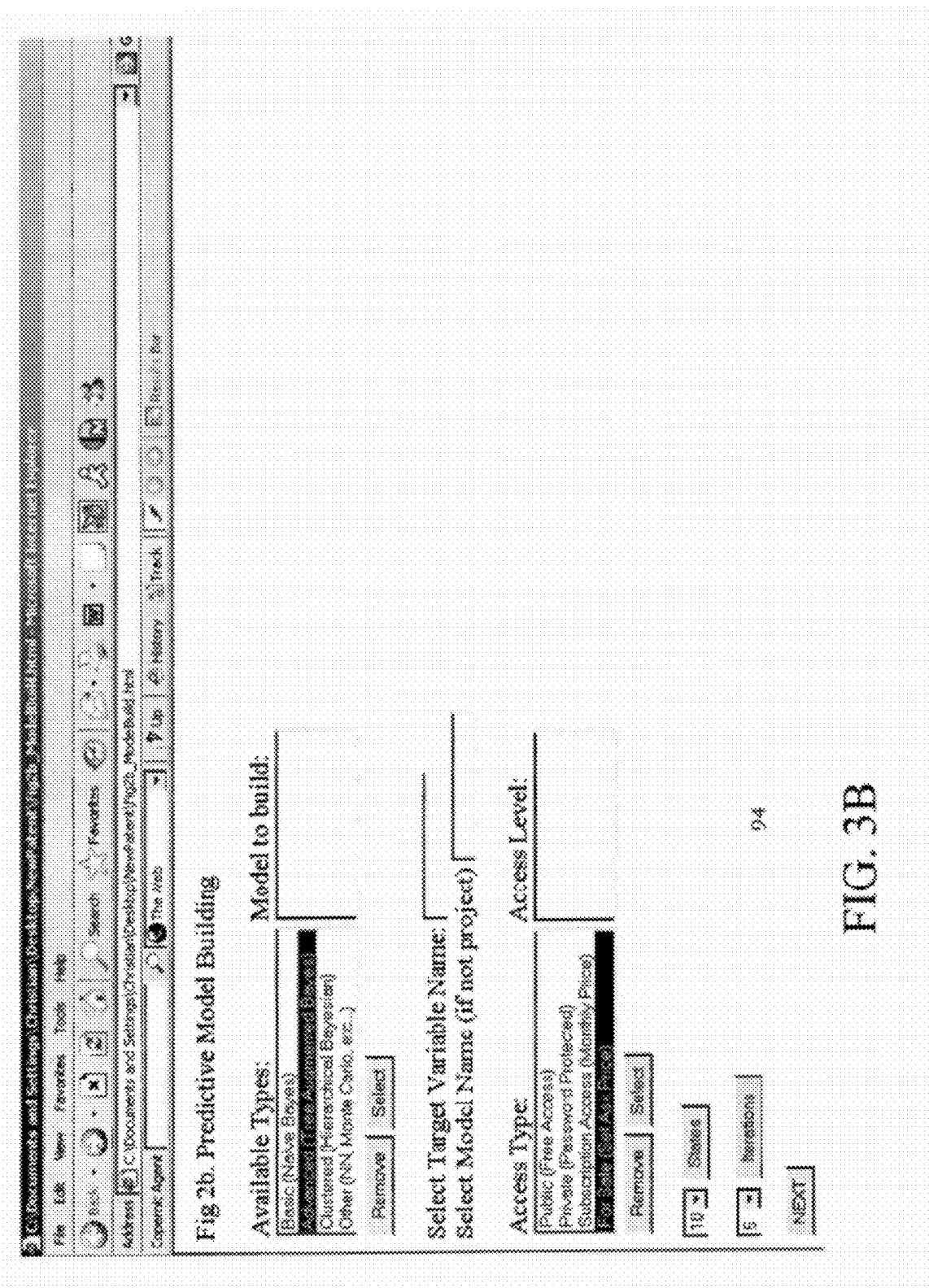

Referring now to FIG. 3B a graphical user interface 94 depicting features of the model building are shown. The system prompts the user to build a model with the collected data. The system prompts to user to select a model type, a target variable specification (if not already detected by the system), a model name specification (the project name is used as a default), access rights (e.g. Free/Private/Subscription/For Sale), the discrete states of the predictive ranges, and the iterations.

The user selects access rights to the application. For instance, the user might select public for their application and to permit all users to use the application. Or a user might select private access privileges. Or a user might select private access privileges to subscribers only. Users might opt to set the model to be sold as a widget to users. Therefore, promoting economic aspects as the trading of predictive models could be encouraged as an exchange. The exchange could be in turn extended into a competitive, on-line game.

The discrete states of the predictive ranges are needed to chop the variable value ranges into intervals that are quantified by the system. "Variable discretization" is converts a continuous attribute into typically, a small finite number of mutually exclusive and exhaustive bins. "Variable discretization" is used when representing a continuous attribute in a model over discrete random variables. For instance, we may "discretize" a value taking values from minus infinity to plus infinity into four intervals as follows:

[–☐ to –<100]; [–100 to <25]; [25 to <256]; [256 to +∞]

Note: –∞ and ∞ denote the range of state going into infinity in either direction. This is incorporated to denote values outside the expected ranges.

The types of predictive model types are also user selected. For instance a Bayesian algorithm or other probabilistic process such as Monte Carlo, Markov Models, Neural Networks, genetic algorithms, and so forth can be chosen.

Any of the predictive model types can be used to construct models based on the data file of cases, discussed above, specified as input. The data file of cases uses a CSV-like format, as discussed above, although other formats could be supported if the change was promulgated throughout the system.

For this example we will assume the construction of models of the following types: Naive Bayes Model; Tree-Augmented Naive Bayes Models; and Hierarchical Naive Bayes Models. FIG. 3B depicts selection of a TAN-B (Tree Augmented Naïve Bayes model)

In general, the model building process builds a statistical model of parent-child relationships from data strings in the dataset by determining incidence values for the data strings in the dataset and concatenating the incident values with the data strings to provide child variables. The process analyzes the child variables and the parent variables to produce statistical relationships between the child variables and a parent variable and determines probability values based on the determined parent child relationships. My U.S. application Ser. No. 11/077,373, filed Mar. 9, 2005 incorporated herein by reference in its entirety discusses techniques for analyzing data for discovery of underlying relationships defined by unknown rules and building models for prediction of future events based on analysis of the data. The process builds an ontology to find the rules, e.g., how data objects in the collection of data in a database relate to each other and can affect the probability of an event occurring.

Bayesian statistical models can be used as the underlying mathematics of the methodology. Bayes' Theorem (by Thomas Bayes (1702-1761)) allows the inferring of a future event based on prior belief and evidence. The theorem defines the posterior probability of a variable A given variable B in terms of the likelihood of A given B (P(B|A,c)) and the prior probability distribution of A (P(A|c)) where c is the context. Upper case letters, e.g., "A, B, C, . . . " are used to denote discrete random variables (with a finite number of mutually exclusive and exhaustive states), whereas lower case letters, e.g., "a, b, c, . . . " are used to denote variable states.

The posterior probability is given by:

$$P(A \mid B, c) = \frac{P(B \mid A, c)P(A \mid c)}{P(B \mid c)}$$
$$\propto P(B \mid A, c)P(A)$$

Bayesian networks are statistical models for probabilistic reasoning using "Bayes' Theorem." A Bayesian network N=(X,G,P) over a random variable "X" includes an acyclic, directed graph G=(V,E) over vertices V representing X (one-to-one) and a set of edges E representing probabilistic dependence relations as encoded by the set of conditional probability distributions P. A Bayesian network is an efficient technique for encoding a joint probability distribution over X:

$$P(X) = \Pi_{A \in X} P(A \mid pa(A)),$$

where pa(A) is the parent set of A in G.

The process of building statistical models based on a database of cases D={$c_1$, . . . , $c_N$} where each case $c_i$ specifies a value assignment to all variables (some values may be missing). For this reason, we focus on three different classes of restricted Bayesian network models: the Naive Bayes Model (NBM), the Tree-Augmented Naive Bayes Model (TAN), and the Hierarchical Naive Bayes Model (HNBM). These models may be estimated automatically from data.

The NBM, TAN, and HNBM are well suited for data mining tasks where a model is estimated from data where the structure of the model is (partly) known in advance. HNBM and other cluster implementations, determine the upper level 'groupings' as the model is built. This feature can minimize computational effort in data-mining to estimate correlations from data.

Common to the three classes of models NBM, TAN, and HNBM is their typical application as a classification tool. Each class of model is often used in the classification type of problems where the value of a target variable is predicted based on observed values of a set of predictor variables (e.g. the classification of an electronic mail as either ham or spam based on observations on the contents of the mail). Each class of models is characterized by the structure of the models in the class.

Each model has of a target variable and a set of predictor (or attribute or feature) variables. $F=\{F_1, \ldots, F_n\}$. The task is to predict the value of T based on observations on (a subset of) $F=\{F_1, \ldots, F_n\}$. The parameters of each model are estimated using an algorithm, such as an Expectation Maximization algorithm (EM) that is a measure of the maximum likelihood of the parameters of the unobserved variables. Details of these models are discussed below.

In FIG. 3B it is assumed that the file wordFreqs.dat is the input data file with training data for the model, S&P_Delta is the target variable, and the user specifies a value of 10 as the (maximum) number of state intervals of "discretized" variables. Each state interval represents a range. For instance, if the range of the interval is 100, an interval of 2 represents 1-50, and 51-100 respectively. For the same range, an interval of 10 represents 1-10, and so forth, as in FIG. 3B. In FIG. 3B, a user defined value of 5 for the number of training iterations is used. Thus, each training iteration is the number of times the algorithmic implementation executes through the training set with the most accurate results selected as the final predictive model used to be used.

Figure 3C:
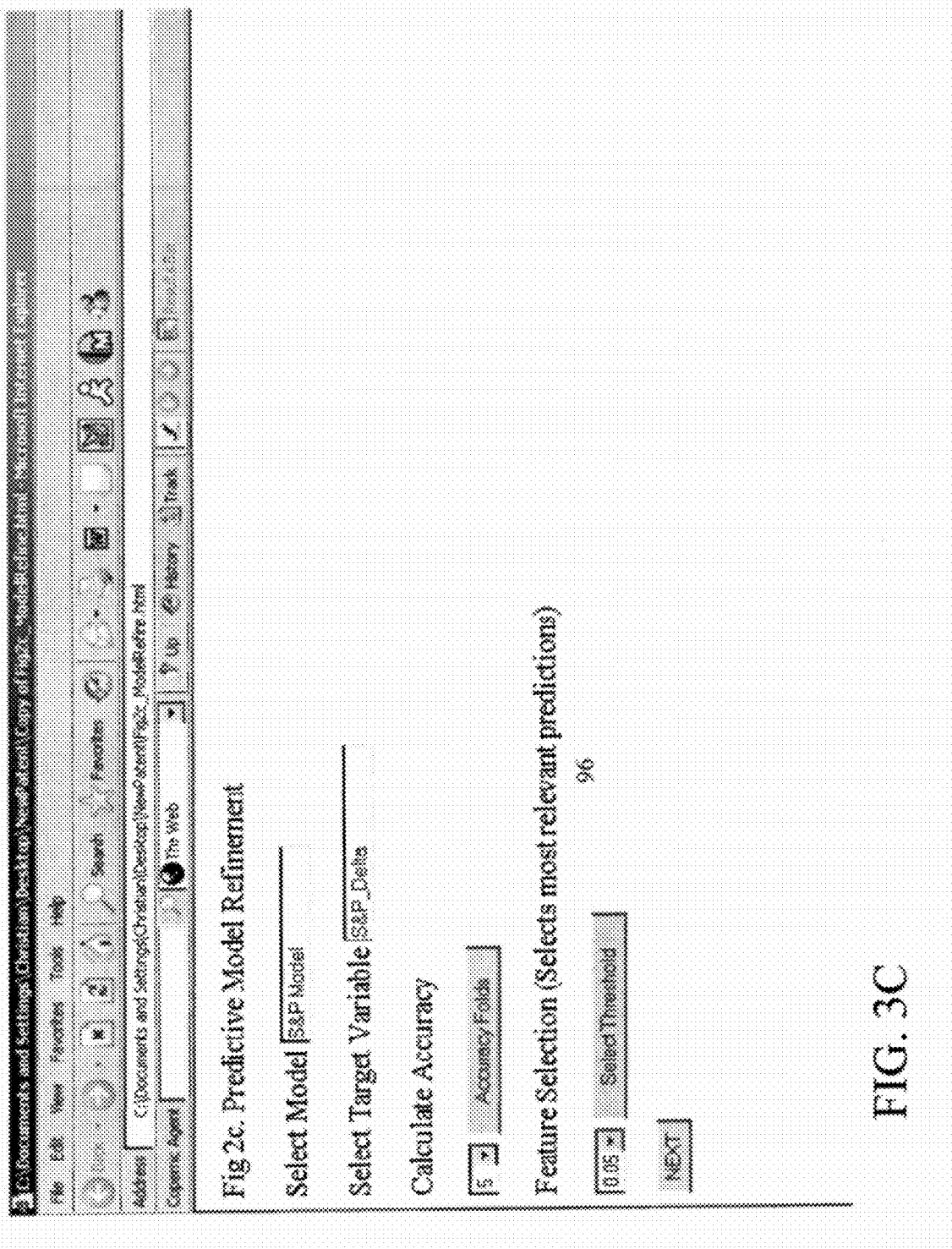

Referring now to FIG. 3C, at this point a model is built. The system optionally prompts the user through an interface 96 to optimize the predictive model and results. For this optimization, the system prompts the user for the model and target variable name if those are not already known by the system. The system allows the user to calculate an accuracy score when the input value is applied to the model. Accuracy scores relate to a model's predictive performance.

Assumptions regarding accuracy of the model are based on mathematical accuracy of the model itself or by comparison to models built by other users. For instance, the system can determine the accuracy of the model by determining whether the mode predicts the event accurately above 50% of the time, given the data, or whether the model perform predictions at a consistent level of accuracy over time. In addition the system can perform back test of historical data to determine whether the model predicts with a quantifiable level of accuracy that historical data.

In the case of mathematically computed accuracy, the so called "k-fold" cross validation technique can be used to compare the model to snapshots of the data. The predictive accuracy of the model is assessed using cross validation. Cross validation proceeds by dividing the data into two disjoint subsets. One subset is used for training the model, whereas the other (unseen) subset is used as the test set for validating the performance of the model, for instance, in terms of prediction accuracy or error rate. The accuracy of the model is the fraction of test cases correctly classified. The k-fold cross validation method is an alternative to cross validation when data is sparse, i.e., when it is undesirable to reserve a significant amount of the data for testing only. The principal idea is to divide the entire data set into k disjoint subsets such that the training and testing is performed k times. In each run a given subset is used for testing while the remaining data is used for training. This implies that each data case is used once for testing and (k−1) times for training.

The system allows a user to perform a 'feature selection' procedure. Feature selection allows a user to discard variables in the model below a certain threshold of relevancy. This allows for performance gains in both calculation time, and in some cases predictive accuracy. Feature selection is necessary in order to manage a potentially huge number of feature variables in the database $D=\{c_1, \ldots, c_N\}$. The feature selection process proceeds by Chi-square tests for statistical correlation between each feature variable $F_i \in \{F_1, \ldots, F_n\}$ and the target variable T. Feature selection is used to remove variables with little or no predictive relevance to the target variable. Feature selection is performed subsequently to the variable discretization process. Thus, the variable discretization process may impact the result of the feature selection process.

When the model is completed and optimized, the model may be published to the community as a searchable item or may remain private, etc according to access rights discussed above.

Search Process

Figure 4:
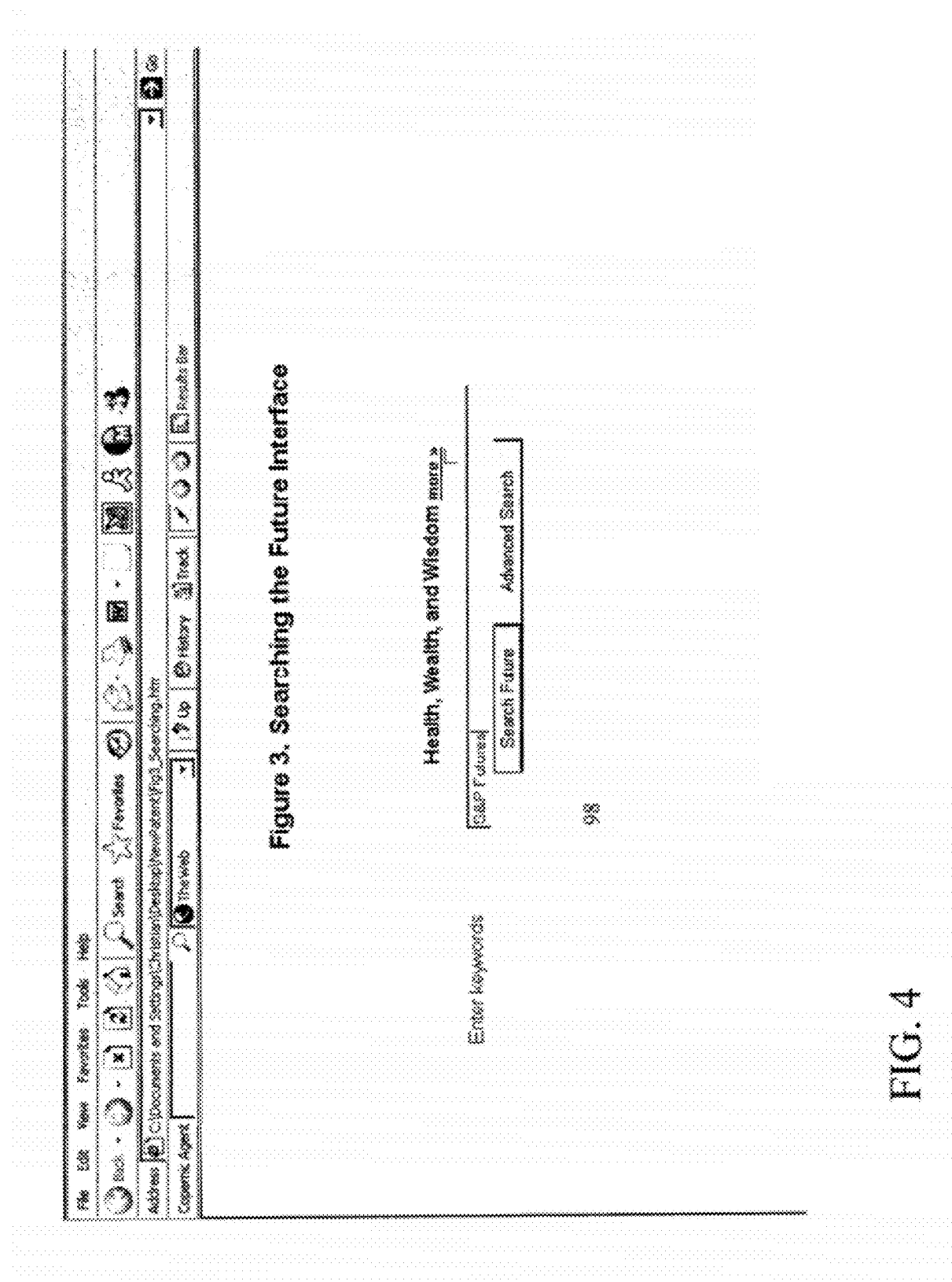
FIG. 4 is a diagram depicting a user interface for searching.

Referring now to FIG. 4, assuming that the model (along with many other models produced e.g., by the same or different individuals and stored in the system) have been set for public use, the model are searchable. FIG. 4 depicts an illustrative initial, search interface 98 to access published predictive models. Search users can select from many model types. Exemplary selections include models that are classified as directed to predictions concerning "Health", "Wealth", and "Wisdom." Wisdom being used here as a generic label to describe less-defined types of data categories. To use the system, users type in search terms, and the system returns predictive models and resulting probabilities for those models. Users can alternatively select models by topic and further refine the selection. In the example the search is for S&P Futures models.

Figure 4A:
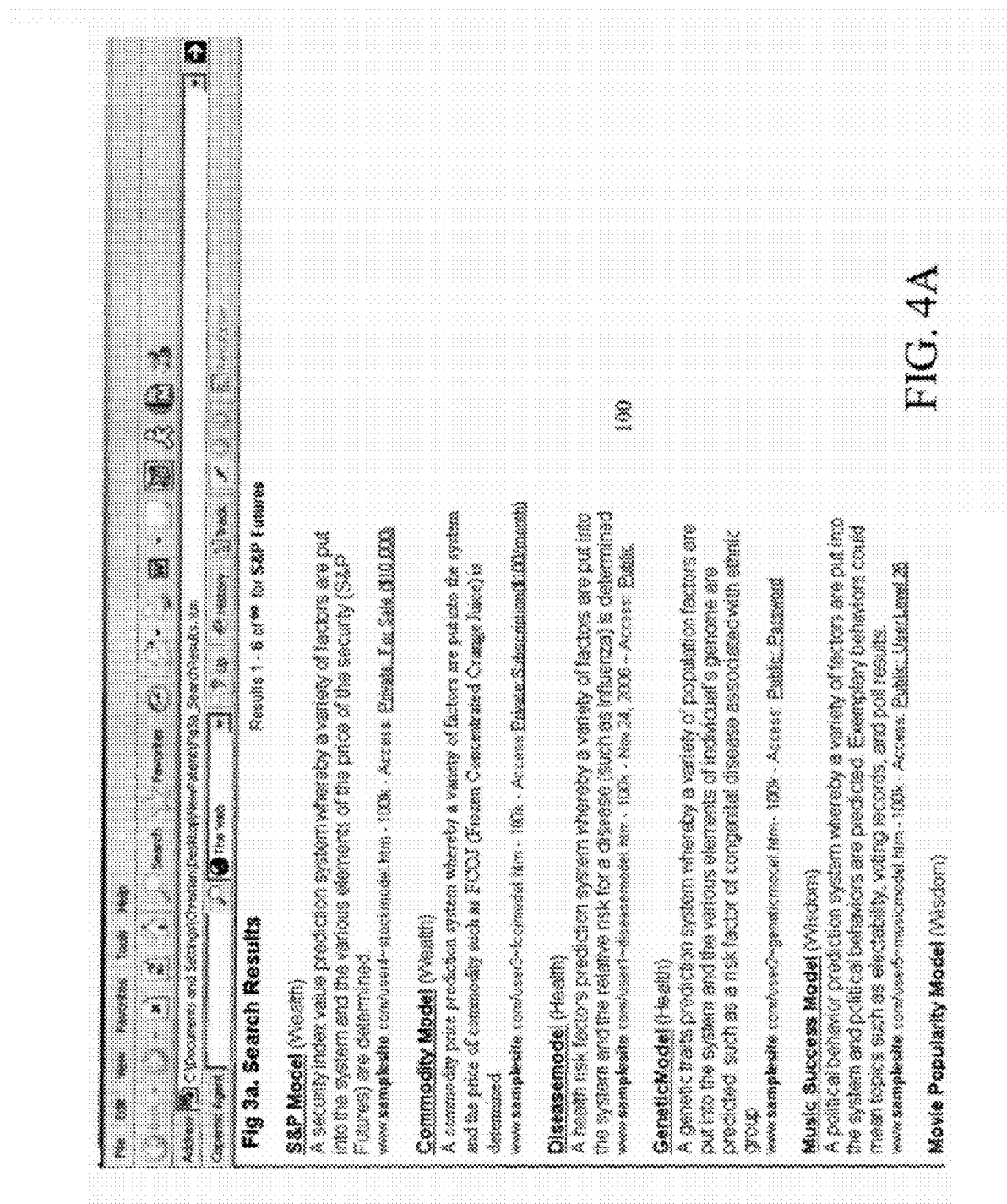
FIGS. 4A-4C are a series of diagrams depicting search results, specific search result and model use.

Referring now to FIG. 4A, the results of a search of future probability models provides exemplary results as in interface 100, as shown. These results denote the user defined name of the model, a description of the model, the url (location) of the model, the data size, the timestamp, and the access level for the user viewing the search result. When the search user clicks on the access level they are prompted with various options of access depending on the level defined by the predictive model's author. In this example the access level is 'Private: For Sale' and the price is $10,000.

Figure 4B:
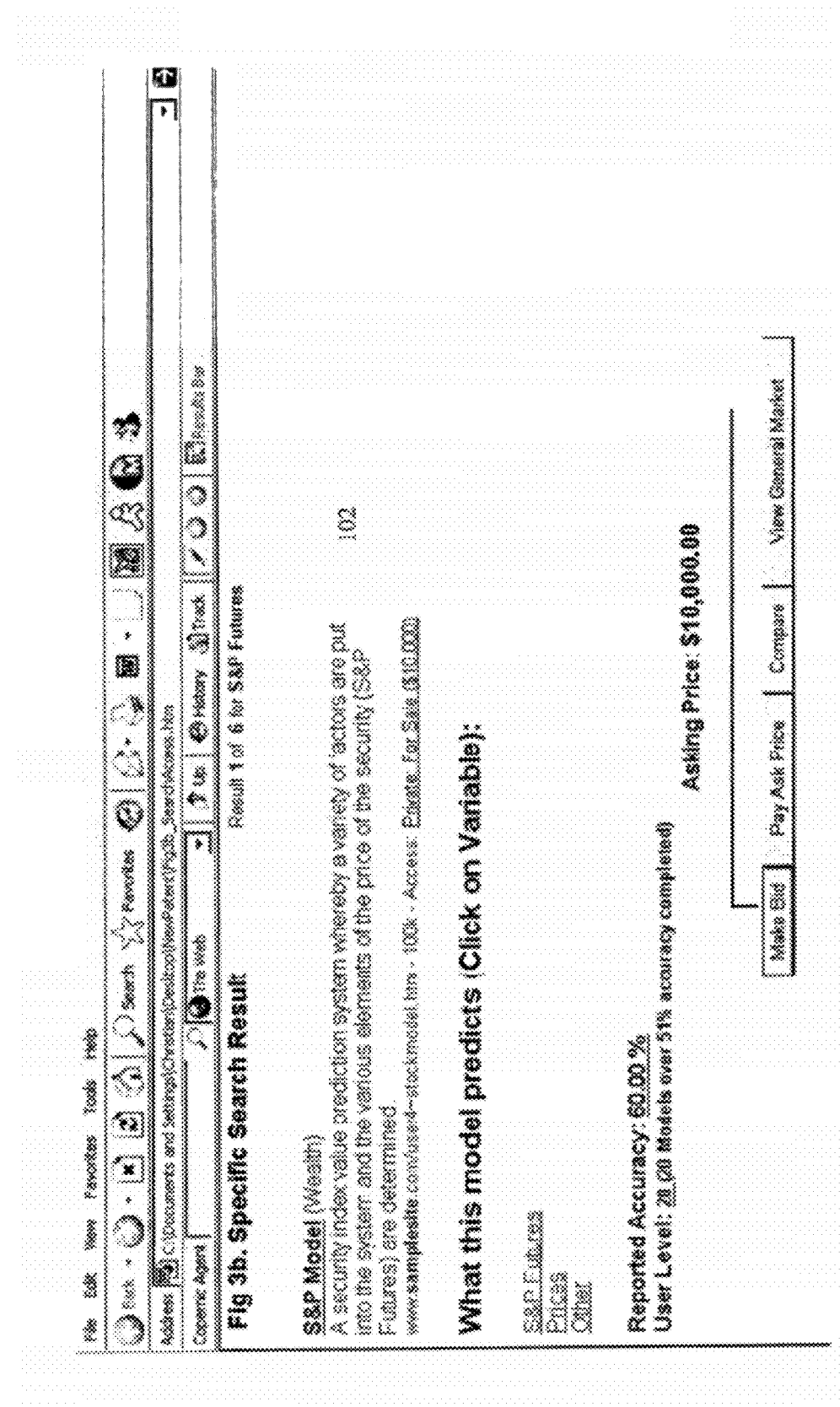

Referring now to FIG. 4B, after the user clicks (selects) the search result and the user is interrupted by an access interface 102 if the model is any other result than 'Free'. In this case, the example S&P Futures model is detailed with a reported accuracy of 60%, and a user (model builder) experience level of 20, with a 'For Sale ASK Price' of $10,000. The search based user can at this point, 'Make Bid' or 'Pay the ASK' price, 'Compare' this model to others of similar description, and 'View General Market' at large to get a sense of prices.

Figure 4C:
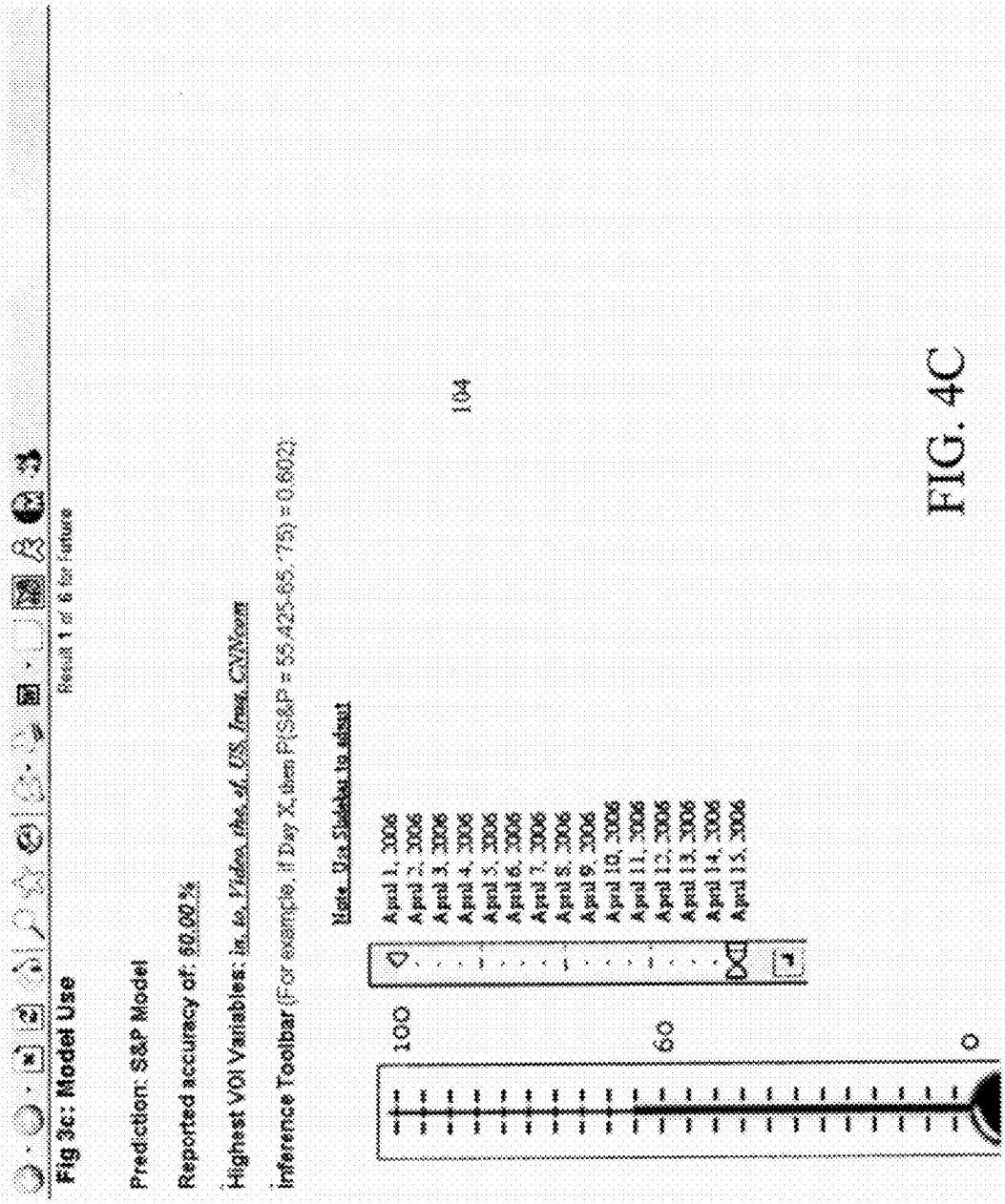

Referring now to FIG. 4C, if a buyer and seller reach an agreement access to the search result is provided to the buyer, and the model is queried via an interface 104 to determine the various predictive scenarios available from the model. The underlying data information would be a combination of statistical predictions, namely Inference and VOI (Value of Information) analysis. However, in FIG. 4C, the data is assumed to be presented in any visually compelling format.

The interface 104 has a slider bar, e.g., in the form of a thermometer style component that allows the user to change the parameters of an Inference/Prediction on any given day (a 24 time increment assumed in the example). The thermometer slider represents data that corresponds to the following notation.

Represents if Day X, then P(S&P=55.425–65.175)= 0.602).

While this is a simple graphical presentation of given model, a real result may be more complicated.

The Value of information (VOI) score is presented in an interface 104 as a separate term. A Value of information (VOI) analysis is performed based on computing mutual information between each predictor variable and the target. VOI calculation is an entropy calculation to measure variable interdependence. The Value of information analysis sorts predictor variables by their predictive power with respect to the target variable. Value of information analysis is, in general, relevant for all types of models, particularly those discussed herein. The underlying assumption in Value of information analysis is that the highest scoring variable deserves the observer's attention first, followed by successfully declining scoring variables. In this example the VOI Variables are "in, to, Video, the, of, US, Iraq, CNNcom."

Markets and User Ratings Process

Figure 5:
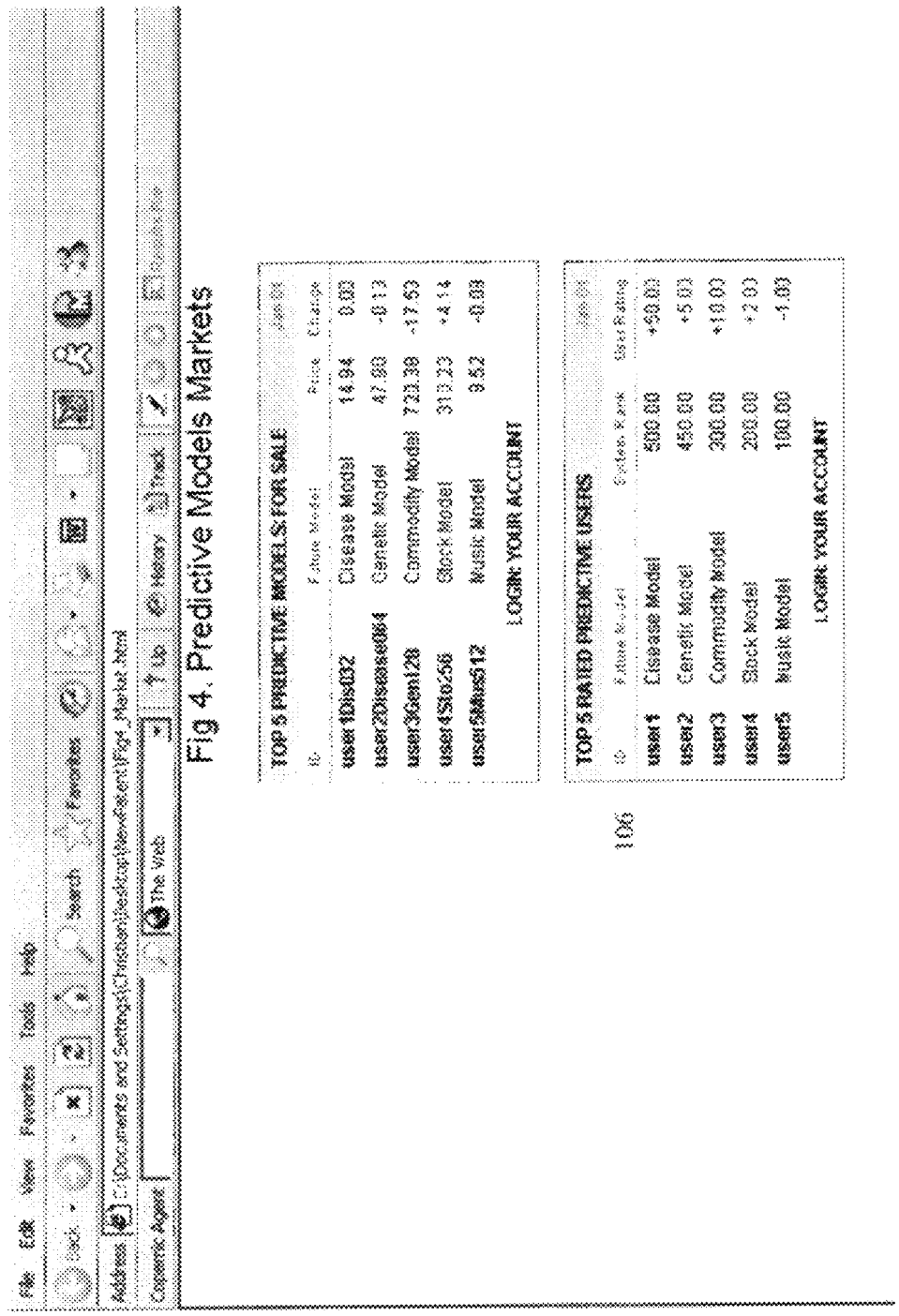
FIG. 5 is a diagram depicting a model market.

Referring now to FIG. 5, at any given time, either a user building the predictive models or a user searching the predictive models could access, via an interface 006, a virtual marketplace for such models, as illustrated. This interface 106 illustrates an exemplary 'ticker' for the models available for commercial access to users and a relative price of those models. Both the cases of "FOR SALE" and "Comparative level/User ratings" are presented. With extending a comparative level, a user enters into a competitive comparison of results from a user's model to results of execution of another user's model, as an in-system game. The comparative level in the system would allow users to build 'reputation' for predictive model building. User defined feedback could be a separately reported item.

The market place can be used for games. For instance, a user rating for models is an example of a game that can be represented within the system. That is, a comparison of user ratings is an example of a simple game that is supported by the system.

Exemplary Usages for the Predictive Models

In the area of "HEALTH" predictive models and the arrangements described can include a "health risk factors prediction system." In the "health risk factors prediction system," a variety of factors are input into a health model in the system and the relative risk (e.g., as a prediction) for a disease (such as Influenza) is determined. Another predictive model can be based on a "genetic traits prediction system." In the "genetic traits prediction system," a variety of population factors are input into a genetic traits model and the system and the various elements of individual's genome are used to predict risk factors congenital disease associated with the user's genome.

In the area of "WEALTH" predictive models and the arrangements described can include a "securities value prediction system," as generally discussed. In the securities value prediction system a variety of factors are input into the system and various elements of security, e.g., the price of the security or the volume traded or volatility of the security are determined. The securities value prediction system can be extended to a commodity price prediction system. In the securities value prediction system, a variety of factors are input into the system and, e.g., the price of commodity such as FCOJ (Frozen Concentrated Orange Juice) is determined.

In the area of "WISDOM" (e.g., knowledge) predictive models and the arrangements described can include a "movie success/revenue prediction system based on a variety of factors that are input into the system to predict the likely box office success (revenue) of a release of the film. Such a tool would be very useful for movie studios and movie distribution companies.

Other WISDOM predictive models and the arrangements described can include a "music prediction system" where based on a variety of factors inputted into the system various elements of music (lyrics, and score) are determined. Other predictive models and the arrangements described can include a "political behavior prediction" system in which political behaviors are predicted based on a variety of factors inputted into the system. Exemplary behaviors could include topics such as electability, voting records, and poll results.

Other predictive models can include a "media bias prediction system" to predict media bias behaviors based on a variety of factors inputted into the system. The marketplace can be extended to "Games" as mentioned above to foster user interfaces based upon competitions to produce more accurate predictions and user competitions to produce original predictions.

Naive Bayes Model (NBM)

Referring now to FIG. 6, the structure 130 of a Naïve Bayes Model (NBM) is shown. Although the structure 130 of the model of FIG. 6 is a NBM it could be representative of other types of models with parent-child modes. Of the models discussed, the NBM is the simplest model type. The NBM captures pair-wise correlations between T and each predictor variable $F_i$. In a NBM the observations $F_i$ and $F_j$ are conditionally independent given T.

The posterior probability of taking on the value given a set of observations $$\epsilon = \{f_1, f_2, f_3\} \text{ on } F = \{F_1, \ldots, F_n\}$$

is computed as:

$$:P(t|\epsilon) = P(t)P(f_1|t)P(f_2|t)P(f_3|t)$$

Tree-Augmented Naive Bayes Model (TAN)

Referring now to FIG. 7 the structure 130 of a Tree-Augmented Naive Bayes Model (TAN) is shown. Although the structure 130 of the model of FIG. 6 is a TAN it could be representative of other types of models with complex conditional structure. The TAN is more complex than the NBM, discussed above. The Tree-Augmented Naive Bayes Model (TAN) captures pair-wise correlations between predictors as well as the pair-wise correlations between T and each predictor variable $F_i$. In a TAN the graph induced by observations $F = \{F_1, \ldots, F_n\}$ is in the form of a tree structure.

In the example, the posterior probability of T taking on the value t given a set of observations $\epsilon = \{f_1, f_2, f_3\}$ on $F = \{F_1, F_2, F_3\}$ is computed as:

$$P(t|\epsilon) = P(t)P(f_3|f_2, t)P(f_2|f_1, t)P(f_1|t)$$

Hierarchical Naive Bayes Model (HNBM)

Referring now to FIG. 8, the structure 140 of a Hierarchical Naive Bayes Model (HNBM) is shown. Although the structure 140 of the model of FIG. 6 is a HNBM it could be representative of other types of models in which unknown and/or latent relationships are discovered by execution of the model. The HNBM is a more advanced model than the others considered so far. (Unlike NBM and TAN, which, in the example, are best for predictive accuracy, the HNBM model type is primarily used to discover the underlying relationships of word components.) The Hierarchical Naive Bayes Model (HNBM) captures correlations between predictors using hidden variables. A variable is "hidden" if the variable is never directly observed by analysis of the data. The structure of HNBM is a tree structure. The structure of HNBM is illustrated where H is a hidden variable.

The posterior probability of T taking on the value t given a set of observations $\epsilon=\{f_1,f_2,f_3\}$ on $F=\{F_1,F_2,F_3\}$ is computed as:

$$P(t \mid \varepsilon) = P(t)P(f_3 \mid t)\sum_H P(f_1 \mid H, t)P(f_2 \mid H, t)$$

While the NBM assumes predictor variables to be conditionally independent given the target variable, the TAN and HBM relax this assumption.

Hierarchical models are the organization of variables into trees that stratify variables according to statistical correlations, conditional on the parent variable. As the 'parent variable' in this case is the target variable, the hidden variable is previously an unknown and introduced in order to capture conditional correlations between words given the target, to provide stratification of the variables.

Hidden variables in the HNBM are identified based on statistical correlation between each pair of predictor variables conditional on the value of T.

A hidden variable H is introduced as the parent of two nodes (feature variables, hidden variables, or a mix thereof) when the statistical correlation between to descendent feature variables conditional on the value of T is above a predefined significance level Let H be a hidden variable introduced as the parent of $F_i$, $F_j$. The state space of H is determined by repeatedly running the EM algorithm with H having one state, two states, etc. with $\|F_i\|*\|F_j\|$ as an upper limit on the state space size of H where $\|Y\|$ denotes the state space size of Y.

The state space size of H is determined as the state space size producing the highest BIC score. We can use a BIC score in order to penalize model complexity.

The invention can be implemented in digital electronic circuitry, or in computer hardware, firmware, software, or in combinations thereof. Apparatus of the invention can be implemented in a computer program product tangibly embodied in a computer and/or a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Figure 9:
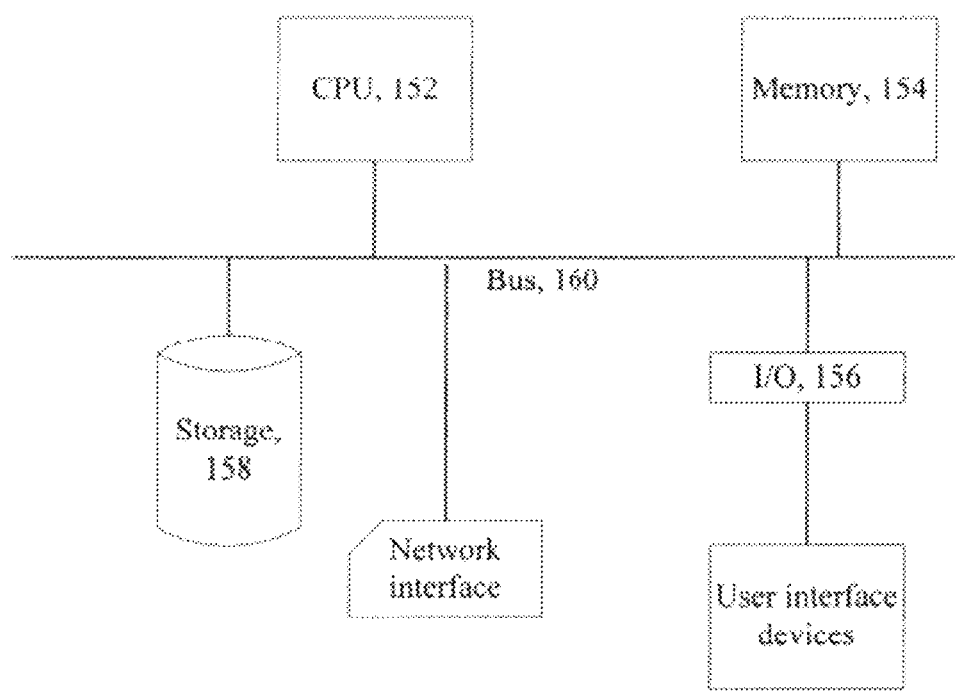
FIG. 9 is a diagram depicting a exemplary computer system.

An example of one such type of computer is shown in FIG. 9, which shows a block diagram of a programmable processing system (system) 150 suitable for implementing or performing the apparatus or methods of the invention. The system 150 includes a processor 152, a random access memory (RAM) 154, a program memory (for example, a writable read-only memory (ROM) such as a flash ROM not shown), a hard drive 156, and an input/output (I/O) controller 158 coupled by a processor (CPU) bus 160. The system 150 can be preprogrammed, in ROM, for example, or it can be programmed (and reprogrammed) by loading a program from another source (for example, from a floppy disk, a CD-ROM, or another computer).

A hard drive controller is coupled to the hard disk 156 suitable for storing executable computer programs, including programs embodying the present invention, and data including storage. The I/O controller 158 is coupled by an I/O bus (not numbered) to an I/O interface 327. The I/O interface 327 receives and transmits data in analog or digital form over communication links such as a serial link, local area network, wireless link, and parallel link.

Other environments could of course be used.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprises:
   storing a plurality of models in a database, with the models of a type that produce predictions of the likelihood of an event occurring in the future, the models having permission levels that specify the access rights to control access to the models by users;
   receiving a search query to search the database that stores the plurality of models, with the models having the permission levels that specify access rights that control access to the models in the database by users,
   executing the search query to produce search results that are provided based on search terms included in the search query;
   sending by a computer system the search results to a user system;
   receiving by the computer system a selection of a model from the search results; and
   sending by a computer system a message to the user system, the message based on the access rights associated with the model, with the message including at least one option to access the model.

2. The method of claim 1 wherein the at least one option is a bid option and the method further comprises:
   causing a user interface that provides a bidding interface to bid on a price for access of the model to be send to the user system.

3. The method of claim 1 further comprising:
   rendering a user interface that provides a listing of models in response to the search query, with the listing including a model type, a text field that contains a summary of a model description, and at least one access rights level.

4. The method of claim 1 wherein the user interface has a control that when selected provides a view of a market for bids on models of the type selected.

5. The method of claim 4 wherein the view of the market for the models comprises:
one or more listings of models, including in the one or more listings model identification information and prices of the models.

6. The method of claim 4 wherein the view of the market for the models comprises:
one or more listings of models, with at least one of the listings having models ranked according to a criterion.

7. The method of claim 4 wherein the view of the market for the models comprises:
one or more listings of models that are ranked within each of the one or more listings according to a user rating criterion, with the one or more listings including in the ranked listing model identification information and user ratings of the models.

8. The method of claim 4 further comprises:
receiving a user query that executes the selected model to determine predictive scenarios available from the selected model.

9. The method of claim 8 further comprises:
executing the received user query; and
generating an interface that renders data that includes statistical predictions from the model.

10. The method of claim 8 further comprises
executing the received user query; and
generating an interface that renders data that includes statistical predictions from the model and a slider bar that allows the user to change parameters of an inference or prediction for a particular day.

11. A computer program product tangibly embodied on a computer readable storage device for accessing models, the computer program product comprises instructions for causing a computer to:
search a database that stores a plurality of models with the models having permission levels that specify access rights that control access to the models in the database by users, search performed in response to a user query, with search results provided based on search terms included in the user query;
send search results to a user system
receive a selection of a model from the results; and
send a message to the user, the message based on the access rights associated with the model, with the message including at least one option to access the model; and
cause a user interface to be sent to the user system, which when rendered on a user device, provides a bidding interface to bid on a price for access to the model.

12. The computer program product of claim 11, wherein
the user interface has a control that when selected provides a view of a market for bids on models of the type selected.

13. The computer program product of claim 12 wherein the view of the market for the models comprises:
one or more listings of models, including in the one or more listings model identification information and prices of the models.

14. The computer program product of claim 12 wherein the view of the market for the models comprises:
one or more listings of models, with at least one of the listings having models ranked according to a criterion.

15. The computer program product of claim 11, further comprising instructions to:
store the models in the database, with the models of a type that produce predictions of the likelihood of an event occurring in the future, the models having the permission levels that specify the access rights to control access to the models by users.

16. The computer program product of claim 11, further comprising instructions to:
receive a user query that executes the selected model to determine predictive scenarios available from the selected model; and
generate an interface that renders data that includes statistical predictions from execution of the selected model.

17. The computer program product of claim 11, further comprising instructions to:
generate an interface that renders data that includes statistical predictions from execution of the selected model and a slider bar that allows the user to change parameters of an inference or prediction for a particular day.

18. The computer program product of claim 11, further comprising instructions to:
render a user interface that provides a listing of models in response to a search query, with the listing including a model type, a field that specifics a text description of the model, and at least one access right level.

19. A system comprises:
one or more computer systems each computer system including a processor and memory and executing a computer program product tangibly embodied on computer readable storage device, the computer program product comprises instructions for configuring the system to:
store a plurality of models in a database, with the models of a type that produce predictions of the likelihood of an event occurring in the future, the models having permission levels that specify the access rights to control access to the models by users;
receive a search query to search the database that stores the plurality of models with the models having the permission levels that specify access rights that control access to the models, with search results provided based on search terms included in the user query;
send search results to a user system
receive a selection of a model from the results; and
send a message to the user, the message based on the access rights associated with the model, with the message including at least one option to access the model.

20. The system of claim 19 wherein the at least one option is a bid option and the computer program product, further configures the system to:
generate a user interface that when rendered on a user system provides a bidding interface to bid on a price for access of the model.

21. The system of claim 19 wherein the
user interface has a control that when selected provides a view of a market for bids on models of the type selected.

22. The system of claim 19 wherein the computer program product, further configures the system to:
render in a user interface one or more listings of models, including in the one or more listings model identification information and prices of the models.

23. The system of claim 19 wherein the computer program product, further configures the system to:
render in a user interface one or more listings of models, with at least one of the listings having models ranked according to a criterion.

24. The system of claim 19 wherein the computer program product, further configures the system to:
receive a user query to determine predictive scenarios available from the selected model.

25. The system of claim 19 wherein the computer program product, further configures the system to:
   generate an interface that renders data that includes statistical predictions from execution of the selected model.

26. The system of claim 19 wherein the computer program product, further configures the system to:
   generate an interface that renders data that includes statistical predictions from execution of the selected model and a slider bar that allows the user to change parameters of an inference or prediction for a particular day.

27. The system of claim 19 wherein the computer program product, further configures the system to:
   render a user interface that provides a listing of models in response to a search query, with the listing including a model type, a field that specifics a text description of the model, and at least one access right level.

\* \* \* \* \*